United States Patent [19]
Gerberding et al.

[11] 3,903,184

[45] Sept. 2, 1975

[54] PRODUCTION OF ORGANOMETALLIC COMPOUNDS OF SODIUM OR POTASSIUM WITH ALKYLAROMATIC HYDROCARBONS

[75] Inventors: Karl Gerberding, Ludwigshafen; Gerhard Fahrbach, Schwetzingen; Erhard Seiler, Ludwigshafen, all of Germany

[73] Assignee: BASF Aktiengesellschaft, Ludwigshafen (Rhine), Germany

[22] Filed: Jan. 7, 1974

[21] Appl. No.: 431,581

[30] Foreign Application Priority Data
Jan. 10, 1973 Germany............................ 2300974

[52] U.S. Cl. ........................ 260/665 R; 252/431 R
[51] Int. Cl. ............................. C07f 1/04; C07f 1/06
[58] Field of Search ................................. 260/665 R

[56] References Cited
UNITED STATES PATENTS

| | | | |
|---|---|---|---|
| 2,163,846 | 6/1939 | Morton et al.................. | 260/665 R |
| 2,394,608 | 2/1946 | Hansley......................... | 260/665 R |
| 3,275,701 | 9/1966 | Theimer et al................. | 260/665 R |

OTHER PUBLICATIONS
Benkeser et al., J. Am. Chem. Soc., 84 (1962) pp. 4971–4975.
Benkeser et al., J. Am. Chem. Soc., 85 (1963) pp. 3984–3989.

*Primary Examiner*—Arthur P. Demers
*Attorney, Agent, or Firm*—Johnston, Keil, Thompson & Shurtleff

[57] ABSTRACT

Production of organometallic compounds of sodium and potassium with alkylaromatic hydrocarbons (X) by reaction of the metal with a monochloride of a hydrocarbon (Y) and reaction of the organometallic compound formed with the alkylaromatic hydrocarbon (X). A fine dispersion of the metal in the alkylaromatic hydrocarbon (X) is first prepared by stirring a mixture of molten metal and hydrocarbon (X) in the presence of a dispersing agent; then the monochloride of the hydrocarbon (Y) is slowly added. The sodium or potassium compounds may be used for organometallic reactions or as monofunctional polymerization catalysts.

7 Claims, No Drawings

PRODUCTION OF ORGANOMETALLIC COMPOUNDS OF SODIUM OR POTASSIUM WITH ALKYLAROMATIC HYDROCARBONS

This invention relates to organometallic compounds of sodium or potassium with alkylaromatic hydrocarbons.

Organometallic compounds of sodium or potassium, for example cumyl potassium or benzyl sodium, are valuable reagents which can be used for organometallic reactions or as monofunctional polymerization catalysts. They are fairly stable to decomposition so that they can be stored as dispersions in nonpolar solvents and also as solutions in certain polar solvents.

The production of cumyl potassium by reaction of potassium sand, n-amyl chloride and cumene, the yield being 49%, is described in J.Amer.Chem.Soc., 85 (1963), pages 3984 to 3988. The potassium first reacts with the amyl chloride to form amyl potassium which then reacts with cumene to form cumyl potassium.

The invention has for its object to provide a general process for the production of organometallic compounds of sodium and potassium with alkylaromatic hydrocarbons and to improve the yields.

This object is achieved by the process according to this invention.

Organometallic compounds of sodium or potassium with alkylaromatic hydrocarbons are prepared. Preferred alkylaromatic hydrocarbons (X) are toluene, ethylbenzene and particularly cumene.

A dispersion of the metal in a hydrocarbon solvent is prepared first. The metal is present in the dispersion in liquid form because temperatures above the melting point are used. Provision is made by vigorous stirring and the addition of a dispersing agent that the dispersion obtained is very fine state of subdivision. The mean diameter of the metal particles should be less than 50 microns and preferably from 1 to 20 microns. Potassium sand on the other hand has a mean particle diameter of about 500 microns. The preferred solvent is the alkylaromatic hydrocarbon (X) but mixtures of this hydrocarbon with other hydrocarbon solvents such as hexane, heptane or benzene may also be used. The dispersing agent is preferably present in an amount of from 0.1 to 5% by weight based on the metal. Examples of suitable dispersing agents are higher carboxylic acids and their salts, polybutadiene, graphite, pyridine and anisol. It is convenient first to stir the molten metal into the solvent and only then to add the dispersing agent.

The dispersion has to be cooled because the further reaction takes place at lower temperatures. To prevent agglomeration of the metal particles the whole is advantageously stirred only slowly or not at all during the cooling.

A monochloride of an aliphatic or aromatic hydrocarbon (Y) having from three to ten carbon atoms is then added to the above-mentioned metal suspension at a temperature of from −50° to +50°C and preferably at from −30° to +30°C. It is preferred to use amyl chloride, butyl chloride or chlorobenzene. The chlorine compound is preferably added as a from 5 to 50% by weight solution in a hydrocarbon solvent. It is convenient to use as the solvent the alkylaromatic hydrocarbon (X) to be metallized.

The addition of the chlorine compound is made slowly enough to keep sudden momentary concentration thereof in the suspension low. Otherwise undesirable side reactions such as the Wurtz-Fittig reaction or elimination of hydride may take place. This may be effected by example by keeping the concentration of the chlorine compound in the solvent low and carrying out the addition continuously or batchwise in a large number of portions at a rate of not more than 1 mole and preferably less than 0.5 mole of the chlorine compound per mole of metal in the dispersion per hour.

In some cases it is convenient to allow the dispersion to stand for some time after the addition of the chlorine compound or to stir it for a short time at elevated temperature so that the reaction of the organometallic compound first formed into NaY or KY with the alkylaromatic hydrocarbon (X) is completed.

The dispersion of the organometallic compound formed (which also contains sodium chloride or potassium chloride suspended therein) may be used direct for further chemical reactions or as a catalyst in polymerization reactions, for example for the production of homopolymers or copolymers of butadiene, styrene or ethylene oxide. The dispersion may however be stored as such or the organometallic compound may be filtered off and dissolved in a suitable solvent, for example heptane or tetrahydrofuran.

The invention is illustrated by the following Examples.

EXAMPLE 1 a. 10 g. of potassium (0.26 mole) is fused and dispersed with vigorous stirring at 80°C in 150 ml of cumene which has been distilled over butyl lithium. Fifteen minutes later 0.25 g of oleic acid is added as dispersing agent. Stirring is stopped and the dispersion is cooled to −10°C.

b. In the course of 2 ½ hours 13.5 g (0.13 mole) of n-amyl chloride (dried over $P_2O_5$) dissolved in 85 ml of cumene is dripped in. A deep blue solution is formed. When the suspension is allowed to stand at ambient temperature overnight a dark red precipitate forms; the supernatant liquid is colorless. The precipitate is washed and filtered off. The yield is determined by potentiometric titration of the carbonium ion according to P.F. Collins, C.W. Kamienski, D.L. Esmay and R.B. Ellstad; Anal. Chem. 33 (1961), 468 and by carboxylation with $CO_2$. It is 90%.

EXAMPLE 2

Example 1 is repeated but the reaction (b) is carried out, not at −10°C, but at +20°C. The dark red precipitate forms practically immediately. The yield is 97%.

EXAMPLE 3

Example 2 is repeated but anisol is used as the dispersing agent instead of oleic acid. The yield is 92%.

EXAMPLE 4

Example 2 is repeated but only 60 ml of cumene is used for dispersing the potassium. The yield is 88%.

EXAMPLE 5

Example 1 is repeated, the addition of the n-amyl chloride being effected within one hour. The dispersion is then stirred for 1 hour at 100°C. The yield is only 66%.

We claim:

1. A process for the production of an organometallic compound of sodium or potassium with an alkylaromatic hydrocarbon (X) by reaction of the metal with a monochloride of an aliphatic or aromatic hydrocarbon (Y) of three to ten carbon atoms and reaction of the organometallic compound formed with the alkylaromatic hydrocarbon (X) which comprises a. preparing a finely divided dispersion of metallic sodium or potassium in a hydrocarbon solvent which consists of or contains said alkylaromatic hydrocarbon (X) by vigorous stirring of a mixture of the metal with the solvent in the presence of a dispersing agent at a temperature above the melting point of the metal to form a dispersion wherein the main diameter of the metal particles in the dispersion is less than 50 microns; and b. adding to said dispersion at a temperature of from −50° to +50°C the monochloride of said aliphatic or aromatic hydrocarbon (Y) at so slow a rate that the local momentary concentration of the chlorine compound in the dispersion is kept low.

2. A process as claimed in claim 1 wherein cumene is used as the alkylaromatic hydrocarbon (X).

3. A process as claimed in claim 1 wherein the monochloride of an aliphatic or aromatic hydrocarbon (Y) is amyl chloride, butyl chloride or chlorobenzene.

4. A process as claimed in claim 1 wherein the mean diameter of the metal particles in the dispersion is from 1 to 20 microns.

5. A process as claimed in claim 1 wherein the dispersing agent is used in an amount of from 0.1 to 5% by weight based on metal.

6. A process as claimed in claim 1 wherein the monochloride of the hydrocarbon (Y) added to said dispersion is a from 5 to 50% by weight solution in the alkylaromatic hydrocarbon (X) as solvent.

7. A process as claimed in claim 1 wherein the addition of the monochloride (Y) to the dispersion is carried out at a rate of less than 1 mole of monochloride per mole of metal per hour.

* * * * *

UNITED STATES PATENT OFFICE
CERTIFICATE OF CORRECTION

PATENT NO. : 3,903,184
DATED : September 2, 1975
INVENTOR(S) : Karl Gerberding et al.

It is certified that error appears in the above-identified patent and that said Letters Patent are hereby corrected as shown below:

In Column 3, Line 11 (Claim 1), delete "main"

and substitute --mean--

Signed and Sealed this

*twenty-second* Day of *June 1976*

[SEAL]

Attest:

RUTH C. MASON
*Attesting Officer*

C. MARSHALL DANN
*Commissioner of Patents and Trademarks*